United States Patent [19]

Grob

[11] Patent Number: 5,707,123

[45] Date of Patent: Jan. 13, 1998

[54] POSITIVE DRIVE RUBBER BELTED TRACK SYSTEM

[75] Inventor: Robert J. Grob, Peoria, Ill.

[73] Assignee: Caterpillar Inc., Peoria, Ill.

[21] Appl. No.: 531,813

[22] Filed: Sep. 21, 1995

[51] Int. Cl.[6] .................................................. B62D 55/12
[52] U.S. Cl. ........................... 305/169; 305/115; 305/180; 305/195
[58] Field of Search .................... 305/56, 57, 35 R, 305/35 EB, 115, 160, 161, 162, 180, 193, 195, 199, 178, 182, 169

[56] References Cited

U.S. PATENT DOCUMENTS

| | | |
|---|---|---|
| 1,786,539 | 12/1930 | Kegresse ........................ 305/169 X |
| 1,790,098 | 1/1931 | Kegresse . |
| 1,814,046 | 7/1931 | Kegresse . |
| 2,273,949 | 2/1942 | Galanot et al. ........................ 305/10 |
| 3,900,231 | 8/1975 | Ohm ........................ 305/178 |
| 4,687,261 | 8/1987 | Atkin ........................ 305/57 |
| 4,953,920 | 9/1990 | Jager ........................ 305/182 |
| 5,352,029 | 10/1994 | Nagorcka ........................ 305/115 X |

FOREIGN PATENT DOCUMENTS 87665    7/1980    Japan ........................ 305/57

*Primary Examiner*—Russell D. Stormer
*Attorney, Agent, or Firm*—Pankaj M. Khosla

[57] ABSTRACT

Prestressed compressible drive blocks are positioned on an endless belt of a track machine. The blocks are mateable with openings in drive wheel and function for driving the track and for guiding the track. Drive bars are associated with the drive wheel openings for exerting pressure on the drive/guide bars while maintaining the drive/guide bars against excessive wear.

13 Claims, 5 Drawing Sheets

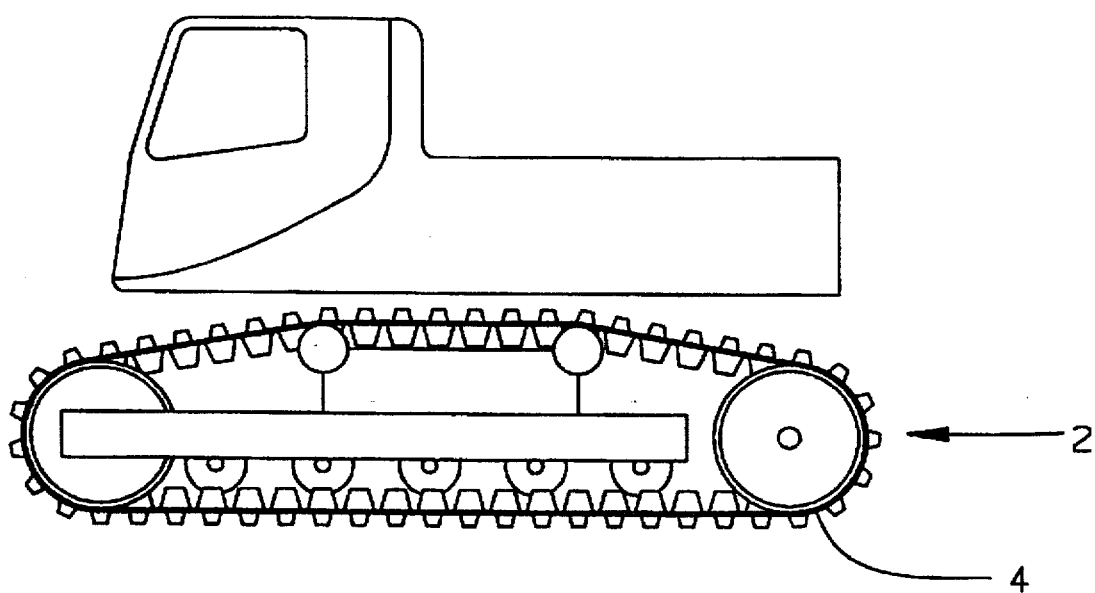
Fig_1_
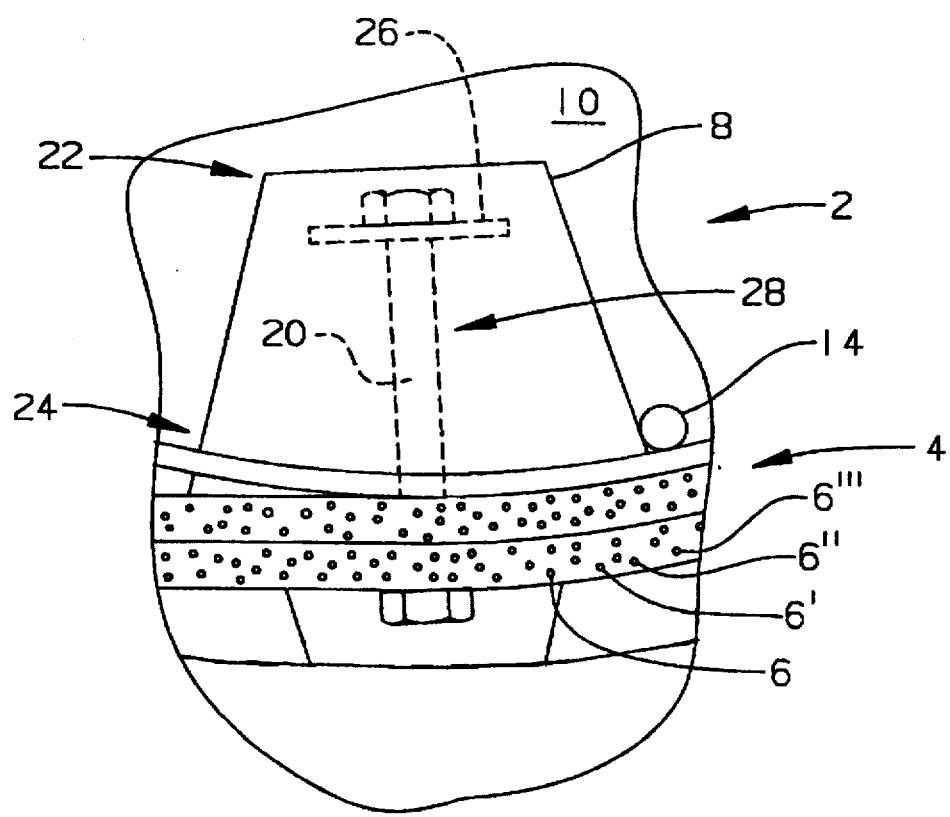
Fig_2_

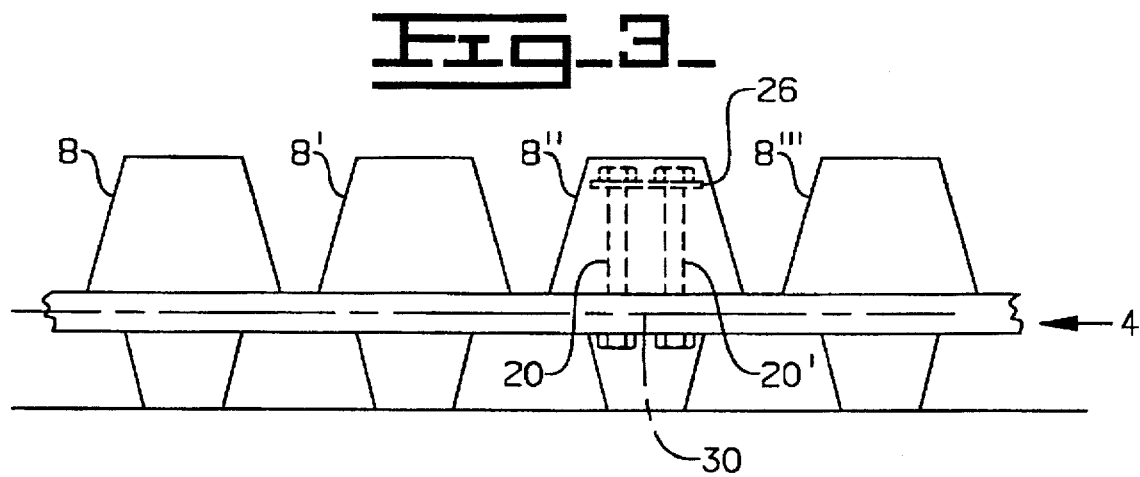
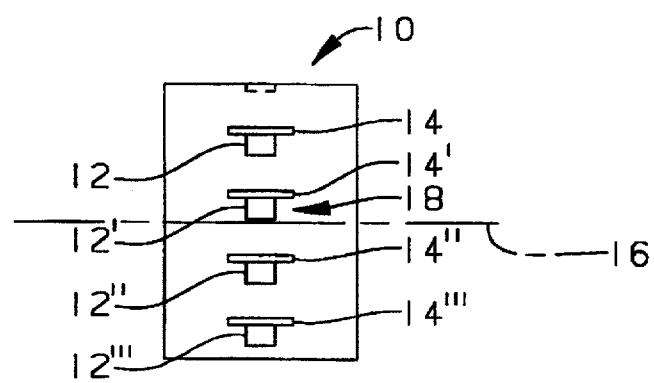
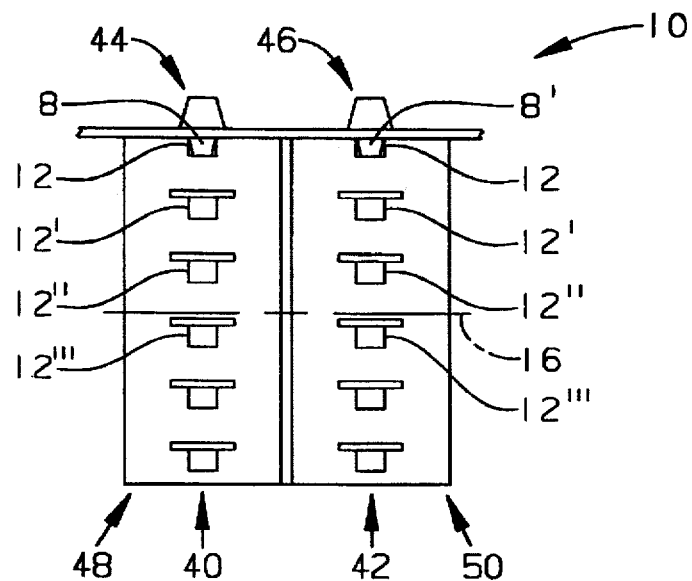

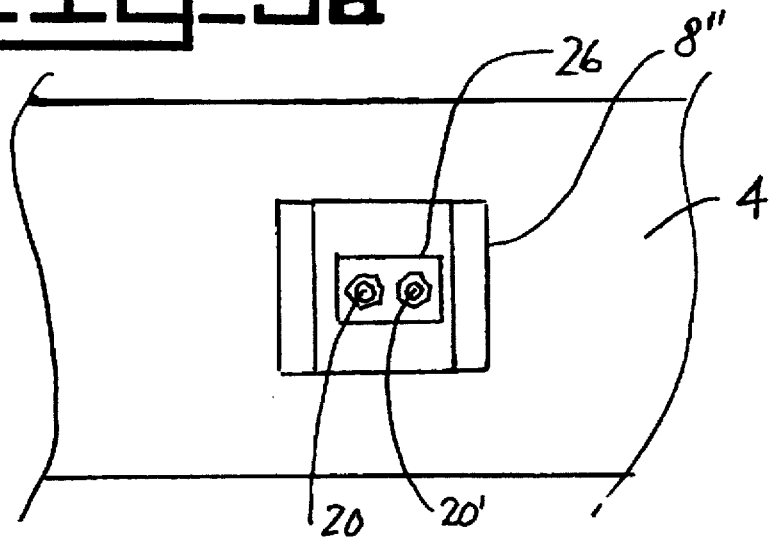
Fig_3a
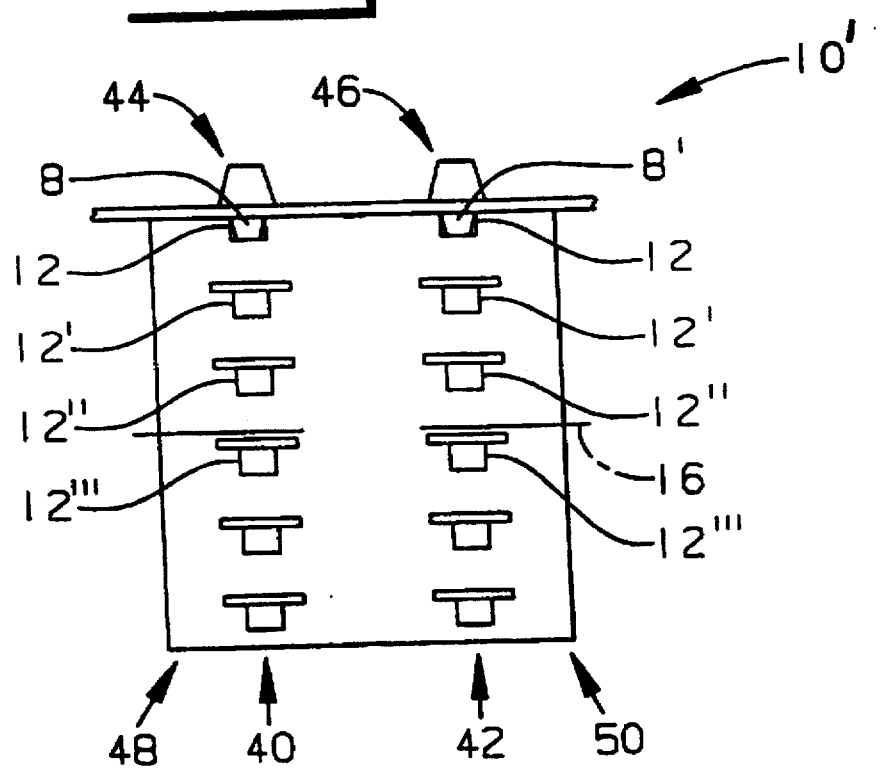
Fig_5a

Fig_6_
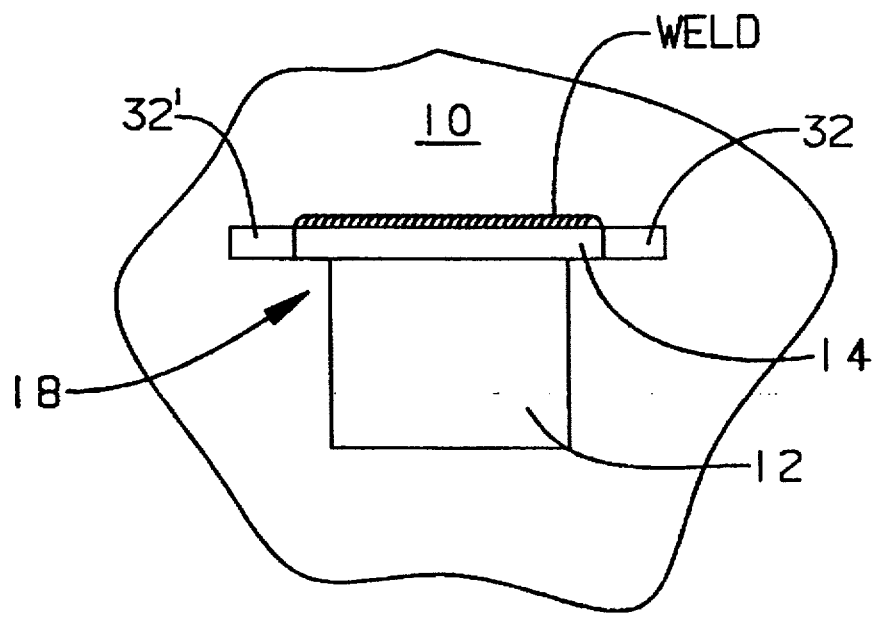
Fig_7_
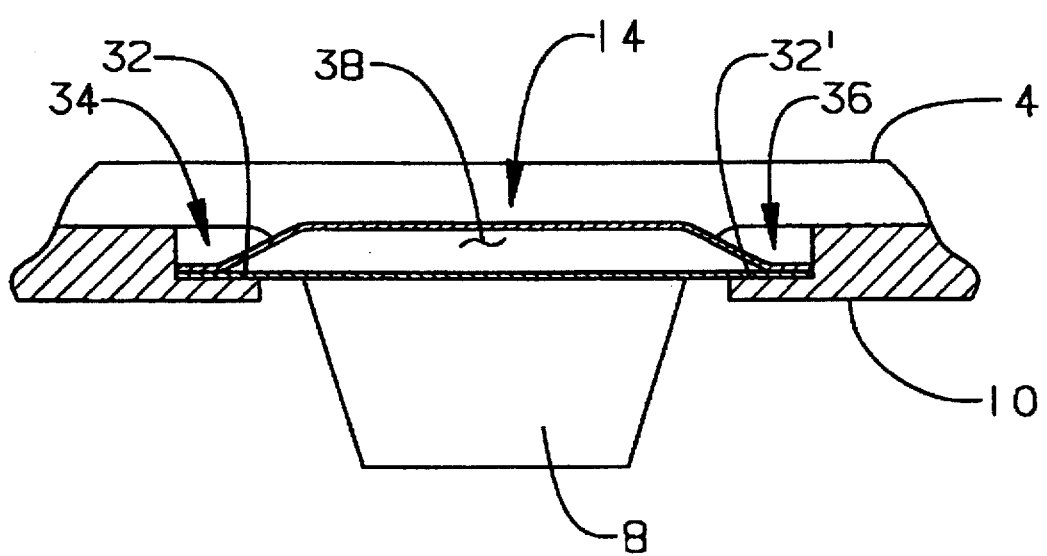

Fig_6a
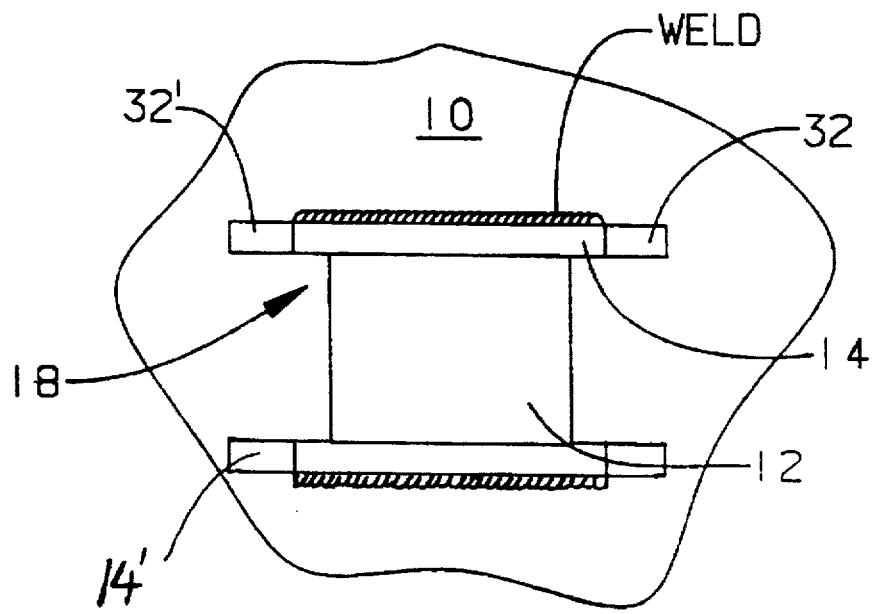
Fig_7a
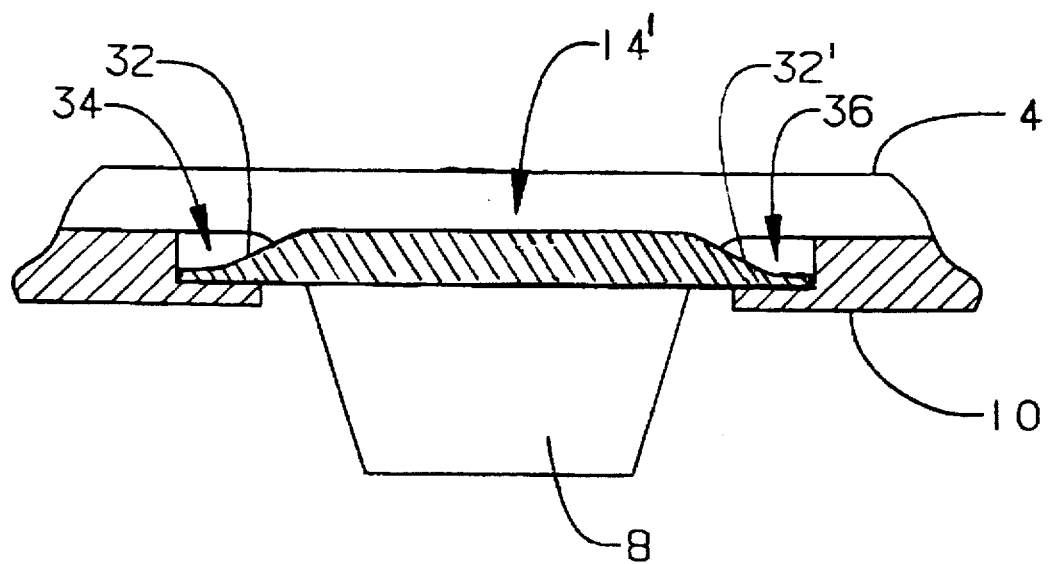

POSITIVE DRIVE RUBBER BELTED TRACK SYSTEM

TECHNICAL FIELD

The present invention relates to a positive drive rubber belted track system for a track machine such as a tractor, for example.

BACKGROUND ART

Various systems have been developed for providing an endless track system which includes the endless track belt and the drive wheel for contacting a portion of the track and moving the track for propulsion of a machine or vehicle, such as a tractor.

One of the latest innovative constructions has been the development of a cable reinforced rubber belt which has an extended life. However, it is desirable to further improve these rubber belts and the drive wheel and provide a system that has improved manufacturing capabilities and avoids the waste of time, labor, equipment and natural resources.

The present invention is directed to overcome one or more problems of heretofore utilized systems.

DISCLOSURE OF THE INVENTION

A rubber belt track system of a track machine has an endless, cable reinforced, rubber belt and outwardly extending driver/guide blocks associated with a drive wheel. The driver/guide blocks are formed of rubber and compressed to a preselected magnitude in a direction toward the rubber belt in the installed position on the belt. The drive wheel has a plurality of openings mateable with the driver/guide blocks. A drive bar is connected to the drive wheel and extends along the wheel axis and along a rearward end of a respective opening of the drive wheel. The drive bar is contactable with a respective drive/guide block in the mateable operable condition of the system. At least one fastening element extends through the belt and into each respective driver/guide block and urges the respective driver/guide block toward the belt in the installed condition.

BRIEF DESCRIPTION OF THE DRAWINGS

FIG. 1 is a diagrammatic side view of a track machine having the system of this invention;

FIG. 2 is a diagrammatic partial enlarged side view of the drive wheel and belt of this invention;

FIG. 3 is a diagrammatic side view of the belt of this invention;

FIG. 3a is a diagrammatic top view of the belt of this invention, showing the elongated load distributing member;

FIG. 4 is a diagrammatic end view of one embodiment of the drive wheel of this invention;

FIG. 5 is a diagrammatic end view of another embodiment of the drive wheel of this invention and the associated belt;

FIG. 5a is a diagrammatic end view of another yet another embodiment of the drive wheel of this invention;

FIG. 6 is a diagrammatic enlarged view of the drive wheel;

6a is a diagrammatic enlarged view of another embodiment of the drive bars according to the present invention;

FIG. 7 is a diagrammatic enlarged view of the slot and drive bar; and

BEST MODE FOR CARRYING OUT THE INVENTION

Referring to FIGS. -3, a positive drive rubber belt track system 2 has a rubber belt 4 that is reinforced with cable 6.

The belt 4 has a plurality of spaced apart, outwardly extending driver/guide blocks 8,8',8",8"' etc. associated with the drive wheel 10. Such a cable reinforced rubber belt 4 and driver/guide blocks 8,8',8",8"' are well known in the art.

In the system 2 of this invention, the driver/guide blocks (hereafter referred to in the written description by a single numeral 8 for purposes of brevity) are formed of rubber and are compressed to a preselected magnitude in a direction toward the rubber belt 4 in the installed position on the belt 4. Referring to FIG. 4, the drive wheel 10 has a plurality of openings 12,12',12",12"' etc. (hereafter referred to in the written description by a single numeral 12 for purposes of brevity). The openings 12 are mateable with the driver/guide blocks 8 of the belt 4.

A drive bar 14 is connected to the drive wheel 10 and extends along the wheel axis 16 and along a rearward end 18 of each respective opening 12 of the drive wheel 10. The drive bar 14 is contactable with a respective drive/guide block 8 in the mateable operable condition of the system 2. Referring to FIG. 3, at least one fastening element 20, and preferably two elements 20,20' extend through the belt and into each driver/guide block. Fastening elements 20 urge the respective driver/guide block toward the belt and into compression in the installed condition of the system 2.

Referring to FIGS. 2 and 3, each driver/guide block has first and second end portions 22,24 and a load distributing element 26 positioned at the block first end portion 22 and associated with the respective fastening element 20 of the system 2. The fastening element 20 preferably is a bolt and nut system 28 passing through openings in the block 8 and the fastening element 20. Preferably, the fastening element 20 is positioned within the respective driver/guide block 8 and is molded within the block 20. The load distributing element 26 preferably is elongated and extends in a direction of the largest dimension of an outer end of the respective driver/guide block 8. Preferably this direction is along the endless longitudinal axis 30 of the belt 4.

The rubber driver/guide block 8 is compressed a preselected magnitude sufficient to exert a pressure desirably greater than about 10 psi and preferably greater than about 20 psi against the belt 4. If the pressure is less than this amount, the driver/guide block 8 will undesirably be subjected to forces tending to separate the driver/guide block 8 from the belt 4.

The drive wheel openings 12 have dimensions not larger than about 20 mm greater than the dimensions of the associated driver/guide block portion immediately adjacent the driver wheel opening 12. If the differential between the dimensions of the drive wheel opening 12 and the associated driver/guide block 8 is greater than 20 mm, the guide blocks 8 will undesirably wear.

In the preferred embodiment of this invention, referring to FIGS. 6 and 7, the drive wheel 10 has a slot 32 extending outwardly from each wheel opening 12. Each drive bar 14 has first and second flattened end portions 34,36 each being within the slot 32 and each drive bar end portion 34,36 being positioned within a slot 32,32 ' and welded or otherwise connected to the drive wheel along the drive wheel slot 32. The drive bars 14 are preferably of tubular configuration having a chamber 38. However, without departing from this invention, the drive bars 14 can be solid and free of a chamber 38.

It is also preferred for balance that the driver/guide blocks and associated guide bars be centered generally along the endless longitudinally extending centered axis of the belt (FIG. 4). However, in another embodiment shown in FIG. 5, the drive wheel 10 can have first and second spaced apart rows 40,42 of drive wheel openings 12 and associated drive bars 14, and the belt 4 can have first and second rows 44,46 rows of driver/guide blocks spaced one from the other and mateable with respective row openings of the drive wheel 10.

As shown in FIGS. 4 and 5, the drive wheel 10 can be formed by the combination of first and second circumferentially extending wheel portions 48, 50 connected one to the other by any operable means known in the art, for example welding, or preferably being of unitary construction, as shown in FIG. 4. If a relatively large load is expected to be carried by the machine when the machine is traveling in the reverse direction, drive bars 14,14' can each be positioned on a respective forward and rearward side of each respective opening 12 of the drive wheel 10.

INDUSTRIAL APPLICABILITY

In the construction of this invention, the load from the drive wheel 10 acts on the block 8 in the circumferential direction enabling it to function as both a guide block and a drive block. The block connection to the belt becomes a cantilevered beam and the drive wheel load generate a shear force and a bending moment. The bending moment result in a tensile stress on the leading end of the block causing the block to become torn in tension from the belt to which its base or second end portion is bonded The fastening element pre-stresses the block in compression. When the driver wheel load is applied, it only reduces the compression on the leading side, not allowing it to go into tension and further increases the compression on the trailing side. The compressive force also provide a frictional force across the block and reduces the likelihood of failure in shear. The system of this invention also provides substantial protection against wear from side-loading of the belt.

Other aspects, objects and advantages of this invention can be obtained from a study of the drawings, the disclosure and the appended claims.

I claim:

1. In a rubber belt track system of a track machine having an endless, cable reinforced rubber belt having a plurality of spaced apart, outwardly extending driver/guide blocks associated with a drive wheel, the improvement comprising:

said driver/guide blocks being formed of rubber and compressed to a preselected magnitude in a direction toward the rubber belt in the installed position on the belt;

said drive wheel having a plurality of openings mateable with the driver/guide blocks;

a drive bar connected to said drive wheel and extending along the wheel axis and along a rearward end of each respective opening of said drive wheel, and being contactable with a respective drive/guide block in the mateable operable condition of the system;

at least one fastening element extending through the belt and into each respective driver/guide block and urging the respective driver/guide block toward the belt in the installed condition;

said driver/guide blocks each having first and second end portions and a load distributing element being molded within said respective rubber driver/guide blocks, said load distributing element being associated with the respective fastening element of the system.

2. A system, as set forth in claim 1, wherein the load distributing element is elongated and extends in a direction of the largest dimension of an outer end of the respective driver/guide block.

3. A system, as set forth in claim 2, wherein the endless belt has an endless longitudinal axis and the largest dimension of an outer end of each driver/guide block extends along the endless longitudinal axis.

4. A system, as set forth in claim 1, wherein said rubber driver/guide block is compressed a preselected magnitude sufficient to exert a pressure greater than about 20 psi against the belt.

5. A system, as set forth in claim 1, wherein the drive wheel openings have dimensions not larger than about 20 mm greater than the dimensions of the associated driver/guide block portion immediately adjacent the drive wheel opening in the installed operating condition of the system.

6. A system, as set forth in claim 1, wherein said drive wheel has a slot extending outwardly from each wheel opening, each drive bar has first and second flattened end portion each mateable with a slot and each drive bar end portion is positioned within a slot and welded to the drive wheel along the drive wheel slot.

7. A system, as set forth in claim 1, wherein each of said drive bars are of tubular configuration, each having a chamber.

8. A system, as set forth in claim 1, wherein each of said drive bars are solid and free of a chamber.

9. A system, as set forth in claim 1, wherein said driver/guide bars are each positioned generally along an endless longitudinally extending centered axis of the belt.

10. A system, as set forth in claim 1, wherein said drive wheel has first and second spaced apart rows of openings associated with said drive blocks, and said belt has first and second rows of drive/guide blocks mateable with respective rows of openings of said drive wheel.

11. A system, as set forth in claim 10, wherein said drive wheel is a unitary element.

12. A system, as set forth in claim 10, wherein said drive wheel has first and second circumferentially extending wheel portions connected to one another.

13. A system, as set forth in claim 1, including first and second drive bars, each positioned on a respective forward and rearward side of each respective opening of said drive wheel.

* * * * *